Figures 1, 2:
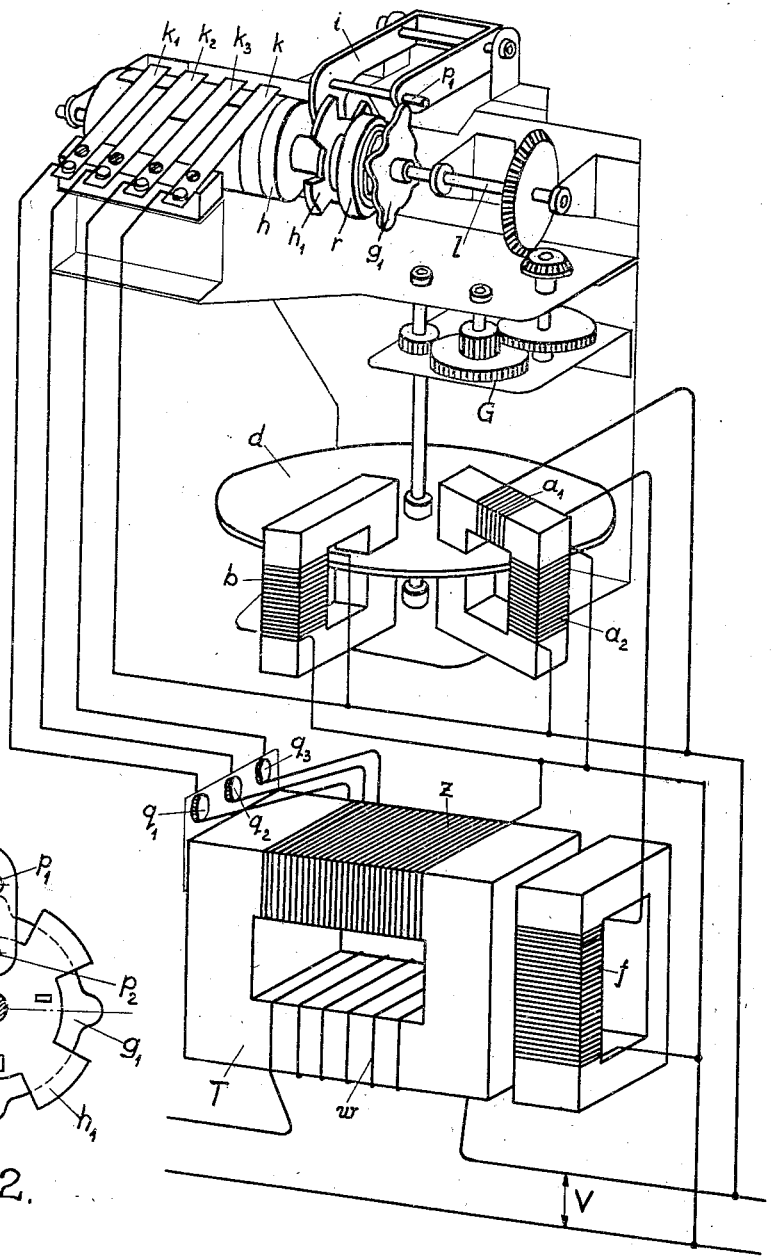

Patented May 28, 1940

2,202,024

UNITED STATES PATENT OFFICE 2,202,024

VOLTAGE-REGULATING EQUIPMENT

Francis Ratkovszky, Budapest, Hungary

Application March 11, 1935, Serial No. 10,493.
Renewed May 19, 1939. In Hungary March 12, 1934

7 Claims. (Cl. 171—119)

My invention relates to voltage-regulating equipments and more particularly to voltage-regulating equipments employing a voltage-regulating transformer and a switchgear belonging thereto operated under the control of a voltage relay.

Various types of the voltage-regulating equipments referred to are known and in general these equipments can be divided into three characteristic parts, viz.:

(a) A measuring instrument (relay) which is fed with energy from the source of current of regulated voltage;

(b) A motive device which in the various types of equipment is fed from various sources of current, e. g. from a direct current auxiliary source of current, or possibly from the regulated voltage etc.;

(c) A regulating device e. g. transformer, which receives its energy from the source of current of regulated voltage and is fitted with switchgear operated under the influence of the measuring system by the motive system. In some cases, when it is necessary that regulation should take place only with a certain time lag after the variation of the voltage, members for producing a time lag are, moreover, inserted between the measuring system and the regulating system. The various kinds of such regulating equipments employed up to now are, however, in view of the large number of individual devices, contained in them, rather expensive which circumstance hinders their general employment for smaller outputs.

As against this, the object of my invention is to provide an improved voltage-regulating equipment which, being composed of a small number of parts, is of simple and inexpensive design, assuring the highest degree of safety of service, and can therefore be employed economically for outputs as low as 1–2 kva.

It is another object of my invention to provide in itself an improved voltage relay of high sensitivity which is suitable for attending alone to the combined task of the measuring systems and motive systems of the arrangements known up to now.

It is a further—but not exclusive—object of my invention to provide an improved type of switchgear for the changing-over of the connections of the tappings of voltage-regulating transformers which can be operated by means of a motive device of small output and which at the same time is itself also suitable for performing the task of the known types of time relays, i. e. for producing the necessary time lag between the voltage variation and the regulation.

My invention makes it possible to provide a voltage-regulating equipment reacting even on small voltage deviations which is entirely automatic, simple, presents a high degree of safety of service and owing to its negligibly small power consumption, can be manufactured at low cost also for the smallest outputs. All these advantages can be assured according to the invention by designing the relay of high sensitivity rotatably so as to be capable of causing a plurality of revolutions in a sense depending on the sense of the voltage variation and by having the motion of the switchgear of the regulating transformer effected by this relay without any auxiliary devices in a direct manner through a suitable mechanical transmission gear inserted between the relay and the switch gear. By means of this transmission gear, which, in order to increase the small operating force or torque of the relay as necessity may require so as to enable to put the voltage-regulator into operation directly, is a reduction gear, it is also possible to introduce a time lag of any desired magnitude in the apparatus without having to employ a special time lag relay.

In order to render permanent rotation possible and to obtain a high sensitivity for the relay it is according to the invention necessary, in the first place, to employ, on the rotary part of the relay, in opposition to non-rotating relays instead of an electrical and a mechanical active component, at least two electrically produced active components acting in opposition to each other. These active components are produced by means of suitable variable impedances in voltage-sensitive electric circuits being fed from the mains voltage and containing the operating coils of the relay, the connection of which circuits will be described in what follows and which, owing to the mutual situation of the operating coils in relation to the rotor axis and by means of the currents flowing in these coils, will exert a resultant torque on the rotor. It is a further necessary requirement for the relay of high sensitivity, that this should be done by means of the said operating coils in such a manner that at the basic voltage the components are balanced, whereas at the variation of the voltage they are varying in a mutually unequal degree so that according to and in dependence on the sense of the variation of voltage, the effect of one of them against the other will become prevalent, and will at a small variation of the voltage cause the rotor of the relay to be displaced with a substantial force. In addition hereto, the said voltage-sensitive circuits are not only feeding the relay which in this case is the motive device itself, but are, as will be clear from the following description, also controlling the magnitude of the variable impedances, producing hereby the voltage-sensitivity, without requiring any further energy supply, i. e. without any separate control circuit having to be employed for this purpose.

By employing a voltage relay of this type (motor relay) in the equipments forming the subject matter of the invention it becomes possible to bring the rotor of the relay into a positive mechanical connection with the contact device serving for the putting in or out of operation of the stages of the voltage-regulating transformer. The relay will in this case perform the joint functions of the relay, of the auxiliary contact and of the servo-motor controlled by the latter of the equipments known up to now.

Figure 3:
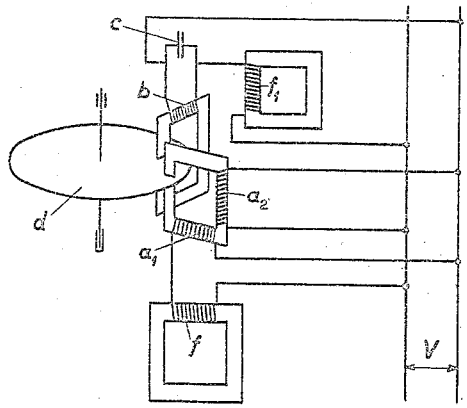

My invention will be better understood from the following description taken in connection with the accompanying drawings and its scope will be pointed out in the appended claims. In this description, in the first place, the arrangements and connections in principle of the electric circuits for producing the active components acting in mutual opposition, and further, on the basis of these arrangements and connections, the diagrams of connection of the rotary relay are described with reference to figures, of which Fig. 1 is an illustration of one embodiment of my invention, Fig. 2 illustrates a constructional detail belonging to Fig. 1, Fig. 3 is the diagram of connections of the circuits of the relay belonging to the embodiment shown on Fig. 1, Fig. 4 is another embodiment of my invention in which differently from the embodiment illustrated on Fig. 1, a relay of different arrangement is employed, Fig. 5 is the diagram of connections of this last-named relay, and finally, Fig. 6 is the sketch of a relay of a third type.

The components acting on the relay against each other and varying in a mutually unequal degree with the variation of the service voltage, may be constituted by voltages acting in opposition to each other in the same circuit or they may be fluxes varying in a mutually unequal manner in case of any variation of the service voltage; it is, however, also possible to employ two circuits connected against each other in which the currents flow with intensities which depend in an unequal degree on the voltage. Fig. 3 which is the diagram of connections of the relay circuits belonging to Fig. 1, shows the last-named arrangement, arranged in such a manner that the magnet of the relay possesses operating coils $a_1$ and $a_2$, one of which is connected in series with a choke-coil $f$ possessing a saturated iron core, whilst the other is connected to the service voltage V for instance in a direct manner, without any saturated iron core. The coils should be dimensioned in such a manner that at the basic voltage the resultant flux produced by these currents should be zero.

The solution of the problem may be of two kinds, according to whether each of the operating coils $a_1$ and $a_2$ possesses a separate magnetic circuit or both coils are made so as to have a common magnetic circuit. In the first case the coils $a_1$ and $a_2$ will, with the aid of the elements of construction to be enumerated in detail in what follows, produce each separately a torque on the rotor of the relay, which torques act in opposition to each other, whilst in the other case the fluxes produced by the coils act in opposition to each other.

Figure 5:
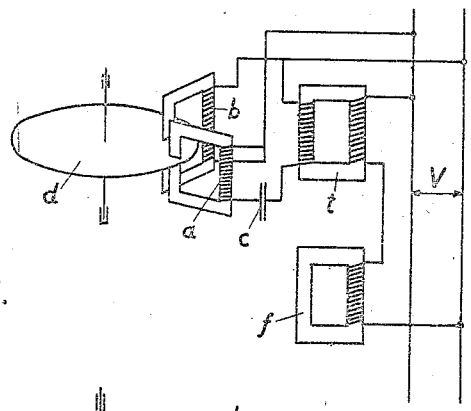
Figure 6:
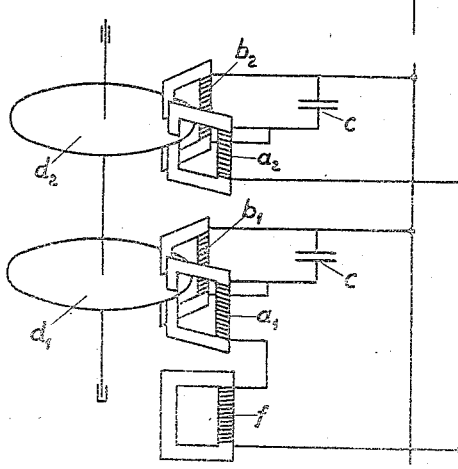
Figure 4:
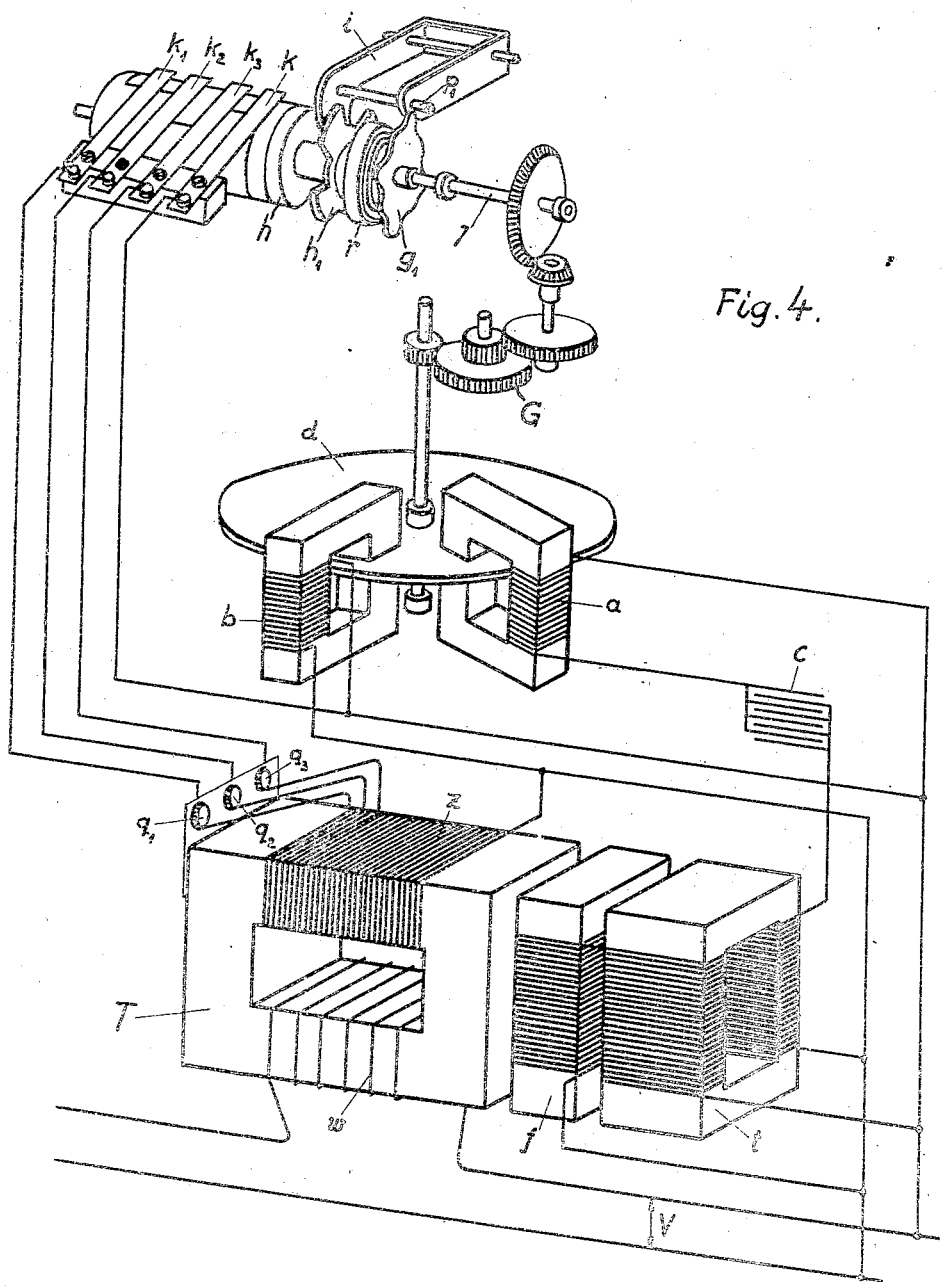

In the arrangements shown on Fig. 5 which is the diagram of connections of the relay circuits belonging to Fig. 4, the components are constituted by voltages. These voltages, acting against each other in the relay coil $a$, are represented on the one hand by the mains voltage V, and on the other hand by the secondary voltage of the transformer $t$ into which secondary circuit the said coil $a$ is connected. The primary coil of the transformer $t$ is connected, in series with the choke-coil $f$ possessing a saturated iron core, to the mains. In the case of any alteration of the mains voltage the voltage of the choke-coil $f$ will vary in a slight degree only even in case of a substantial alteration of the current flowing through it, in consequence whereof the secondary voltage of the transformer $t$ of low saturation will become altered in a substantial degree. In view of the slight alteration of the voltage of the saturated choke-coil $f$ it is also possible to connect the coil $a$ in series with the secondary coil of the transformer $t$, to the terminals of this choke-coil, instead of connecting it to the mains voltage.

A resultant current varying in the above sense can also be produced in such a manner that a single operating coil is connected in series with two coils in which currents are induced by fluxes of opposite direction and varying in different degree with the service voltage.

The arrangements illustrated in Figs. 3 and 5 should of course only be considered as examples because the effect characterizing them can in general also be obtained by operating circuits of which at least one possesses in general variable ohmic, inductive or capacitive resistances the magnitude of which is dependent upon the intensity of the current.

The design of the relay operated by circuits of the aforementioned nature may be of the most varied kinds. For producing the rotation it is possible to employ motor equipment which may for instance be similar to direct current motors, instruments of the Ferraris-disc type, notably instruments similar to the well-known Ferraris-disc amperehour meters, or what is more preferable still, instruments similar to Ferraris-disc watthour meters.

For creating the torque, in case of instruments of the Ferraris-disc type, two kinds of coils are in general required, and the various arrangements may be considered as representing parallels of the corresponding arrangements of the ammeters and wattmeters, according to whether of the two coils both, or only one is placed below the influence of the components depending on the voltage variation, whilst in the last-named case the other coil is connected to the service or to a voltage varying in a smaller degree only with the variation of the service voltage.

Of the figures of the drawings annexed, Figs. 3 and 5 are showing such arrangements based on the Ferraris wattmeter type, whilst Fig. 6 shows an arrangement of the Ferraris ammeter type.

According to the diagrammatical arrangements shown on Figs. 3 and 5 the current coil $a$ and the voltage coil $b$ act on the rotor $d$ of the device like a meter. The current flowing in the coil $a$ and corresponding, according to what has been said above, to the amount of the variation of the voltage, is, together with the current flowing in the voltage coil $b$, producing a torque. With the coil $a$ of the arrangement shown on Fig. 5, a condenser $c$ for phase adjustment may also be connected in series, which condenser should in this case, and in all cases where a similar purpose is aimed at, preferably be dimensioned in such a manner as to render it suitable for compensating the whole of the inductivity existing in its circuit, in consequence whereof, on the one hand, a maximum amount of current and, on the other hand, a current possessing no phase displacement will flow, and it will thus be possible to produce a high torque. It is even possible to consider the connection in series of a condenser effecting overcompensation, because in such a case the load circuit of the transformer becomes one of capacitive character, and a voltage rise is set up in it, whereby sensitivity is increased.

In the case of the embodiments according to Fig. 3, the choke-coil $f_1$ and the condenser $c$ for the adjustment of the vector position giving the maximum torque may, for instance, be situated in the circuit of the voltage coil.

The relay arrangement shown in Fig. 6 possesses two operating coil systems formed by the coils $a_1$ and $b_1$ and by the coils $a_2$ and $b_2$. The coils of each system are connected, similarly to the connection of the Ferraris-disc ammeter, in series with each other and for the purpose of producing the torque a condenser $c$ is connected in a known manner in parallel to $b_1$ and another condenser $c$ in parallel to $b_2$. The production of the components acting in mutual opposition is thus effected in two operating circuits in such a manner that the system $a_1$, $b_1$ is connected to the controlling voltage through the saturated choke coil $f$, whilst the system $a_2$, $b_2$ is connected to the controlling voltage V in a direct manner. Owing to their mutual arrangement, these operating coil systems exert torques in opposite senses on two separate discs $d_1$ and $d_2$ of a common shaft or on a common rotor.

By way of two separate devices mechanically combined, operating on a common disc or shaft, as shown in Fig. 6, it is also possible to employ the arrangements according to the wattmeter type, in which cases in each of the two separate coil systems the one or the other of the components varying in an unequal degree with the variation of the voltage is acting.

The sensitivity of the devices according to the invention depends on the amount of the relative difference between the variations of the components acting in mutual opposition. From this point of view, it is important, not only in the case of the arrangements according to Figs 3 and 5, but also in the case of other arrangements that suitably dimensioned capacities should be employed in series or parallel connection with the operating coils, in order to ensure the desired phase displacement, which latter may possibly depend on the voltage. In order to increase the difference between the varying components it is necessary that the characteristic of the saturated choke-coil or transformer should be as flat as possible over the operating section, i. e. that the choke-coil or transformer should operate at a degree of saturation at which a great variation of magnetising current corresponds to a small variation of voltage. In order to ensure this it is desirable that the magnetic circuit should if possible include no air-gap at all, or only an air-gap of negligible magnitude.

In order to enable the components acting in mutual opposition to be brought into exact mutual equilibrium at the basic voltage, it is necessary that at least one of the components should be amenable to control. If there is employed a system comprising two circuits, by each of which, separately, a torque is being exerted, these torques can be controlled, independently of each other, in a known manner.

In other cases control can be effected by means of shunting employed in some circuit, for instance by shunting one of the coils producing the torque or by shunting one of the saturated and unsaturated choke-coils or transformers or condensers mutually connected in parallel. Control can also be effected by magnetically shunting either the saturated iron cores at the saturated parts, or the unsaturated iron cores at the places of junction of the sheets. This control can be effected once for all when calibrating the apparatus, but the arrangement can also be such as to enable the control member to be adjusted at will at any time in an easily accessible manner, for instance also on lead-sealed devices and thereby enable the basic voltage to be varied between certain limits as necessity may require.

The instrument described and forming part of the subject-matter of the invention, is, particularly in consequence of the reducing transmission gear employed, suitable—without having to employ an expensive device of excessive dimensions and of excessive consumption, for exerting dynamic effects of considerable magnitude already at small variations of voltage, and is thus, in addition to being able to operate contacts for low currents, i. e. contacts for auxiliary currents, also suitable for switching larger currents.

In the case of switching such currents it is preferable to make provision for the switchings, and notably in a given case, the connections as well as the disconnections being effected instantaneously.

In such a case provision must be made for a mechanism capable of utilizing the permanent rotation of the disc, slowed down by means of the transmission gear, for the instantaneous connection and disconnection of the contacts after a certain number of disc revolutions have been performed. This purpose may be achieved by means of the mechanism illustrated on Figs. 1 and 2, or on Fig. 4, in which $d$ is the revolving disc by which the shaft $l$ is being moved with the aid of the diagrammatically shown transmission mechanism G. On shaft $l$ there is keyed the disc $g_1$, and in this case there turns loosely around the shaft the toothed disc $h_1$, which forms one piece with the cylinder $h$ of a contact apparatus, which latter may be, for instance, of the controller type, by which the contacts $k$ and $k_1$, $k_2$, $k_3$ are controlled. The loose disc $h_1$ and the keyed disc $g_1$ are shown in side elevation on Fig. 2 together with a pawl $i$, which is displaced from its position by the keyed disc $g_1$ owing to the cam like design of the periphery of the latter, after the said disc has performed a certain number of revolutions, following which the peg $p_1$ of the pawl $i$ will allow free motion to the loose disc $h_1$ and to the cylinder $h$ connected with the latter. The displacement from its position of the loose disc $h_1$ at the occasion of the release of the pawl is due to the fact that during the time during which the pawl has remained in its normal position, that is to say during the time during which the pawl has been engaged in the disc $g_1$, the latter has turned relatively to the toothed disc $h_1$ and has whilst closing wound up a spiral spring $r$ connecting the two discs, to which spring a preliminary tension has preferably been given. Accordingly, as soon as the pawl is forced out of the keyed disc by the cam, the spring is already wound up, in consequence whereof the loose disc snaps over instantaneously into its next position limited by the peg $p_2$ of the pawl $i$ and by one of the pegs $n$ of the disc $h_1$. During the further turning of the keyed disc the pawl $i$ with its peg $p_1$ returns again up to the base circle of the disc $g_1$ and locks the loose disc, whilst in case it turns still further the process already described is repeated. The arrangement illustrated relates to a control cylinder having a number of positions, i. e., when the disc of the meter continues its rotation, further instantaneous connections can be effected repeatedly after a certain number of disc revolutions. During the instantaneous connections one or more contacts can be operated, notably opened or closed in the manner described. The arrangement shown on Figs. 1 and 2 can also operate in the case of disc rotation in both directions, since it connects the loose and keyed discs also with the spring which is being wound up in the case of movement in the other direction. The spring $r$ connecting the loose and the keyed disc can at the same time preferably also be employed as a counter-torque by which the tolerance limit is fixed, this being done by selecting the size of the said spring so that for its winding-up there should be required a torque exceeding the torque caused by the permissible voltage deviation. In this case it is particularly advisable to design the transmission gear of the rotating disc and of the controlling cylinder by using spur and bevel gears only, and without inserting any worm gear, because in the case of a worm gear, owing to the low efficiency of the latter, a substantial part of the torque available is lost, which fact greatly influences the reliability and accuracy of the apparatus. If it is essential that the starting voltage deviation should be adhered to very accurately it is possible to employ here also, either on the magnet system effecting the rotation or on a special magnet system provided for this particular purpose, the auxiliary coil already mentioned, which gives to the disc a counter-torque of constant direction of so great magnitude which just corresponds to the torque set up by the permissible voltage deviation.

Instead of the instantaneous switch mechanism described, it is of course also possible to employ any other switch mechanism, e. g. a switch in which the controlling cylinder of Fig. 1 is substituted by a cam cylinder, being suitable to compress contacts and counter-contacts, or to allow them to separate, according to whether connections or disconnections are to be effected.

The purpose for which the employment of such relays and contact devices is considered, is, as has been said above, the switching of voltage regulating transformers by means of these contacts, or their changing-over direct from one stage to the other. As according to Figs. 1 and 2 or Fig. 4, the relay may be fitted with a switching device possessing a number of positions and a number of contacts, the apparatus is particularly suitable for the automatic switching of multi-stage voltage regulating transformers, notably, not only for the changing-over of tappings provided on the low-voltage transformer coils or on some auxiliary coils the voltage of which may be independent of the service voltage, but also for the changing-over of the high-powered transformer coils, as shown on Fig. 1 or 4 in connection with a voltage-regulating transformer T, having a current coil $w$, a voltage coil $z$, and tappings $q_1$, $q_2$, $q_3$ on this latter. As the number of contacts may be as high as desired and, moreover, openings and closings can also be effected in any desired combination by designing the controlling disc or cylinder in a suitable manner, the devices are suitable for the direct or indirect operation of single-phase or multi-phase voltage regulating transformers of any system and possessing any number of stages.

In the case of the multi-phase mains system the voltage may be controlled by means of a joint multi-phase regulating transformer, but in case the voltages of the various phases differ also between themselves, it is possible to employ separate single-phase regulators for each phase, whereby it is possible to automatically control not only the average voltage but also to effect automatic control between the voltages of the various phases.

Having now fully described and ascertained the said invention and the manner in which it is to be performed, I declare that what I claim is:

1. Voltage-regulating equipment, comprising, in combination, a multi-stage regulating transformer; a voltage relay of the Ferraris-disc meter type; a voltage winding for said relay; two coils for said relay being wound in opposite sense as regards their ampere turns on the same iron core and co-operating with the said voltage coil in the manner of the current coil of a wattmeter; a reducing transmission gear of a constant proportion of the transmitted revolutions, coupled on its high-speed side in a direct manner with the disc shaft of the said relay; and a contact device having a plurality of contact positions connected electrically with the regulating terminals of the said transformer and being mechanically coupled with the low-speed side of the said reducing gear, comprising a contact cylinder of the controller type suitable for the control of the contacts and running loosely on its axis, a toothed disc mechanically connected with said cylinder, pegs fitted on the disc face, a fixed cam disc, a spring preliminarily wound-up by the rotation of the fixed cam disc and connecting said toothed disc, a pawl oscillating parallel to the faces of the said discs and having two pegs, one of the pegs co-operating with the cam and teeth respectively of both discs and the other peg with the toothed disc; said discs, pawl and pegs being designed and arranged to permit said contact cylinder to perform limited instantaneous angular deflections only, and said two relay coils being adjusted so as to bring their motive effect on the relay, a stand-still at the voltage to be maintained constant.

2. Voltage-regulating equipment, comprising, in combination, a multi-stage regulating transformer; a voltage relay of the Ferraris-disc meter type; a voltage winding for the said relay; a saturated choke coil; a transformer connected in series with said saturated choke-coil to the voltage line to be regulated; another coil for the said relay co-operating with the said voltage winding in the manner of the current coil of a wattmeter and connected in series with the secondary coil of said transformer and, with respect to the sense of the voltage of this secondary coil, counter to the voltage to be regulated; a reducing transmission gear of a constant proportion of the transmitted revolutions, coupled on its high-speed side in a direct manner with the disc shaft of the said relay; and a contact device having a plurality of contact positions connected electrically with the regulating terminals of the said transformer and being mechanically coupled with the low-speed side of the said reducing gear, comprising a contact cylinder of the controller type suitable for the control of the contacts and running loosely on its axis, a toothed disc mechanically connected with said cylinder, pegs fitted on the disc face, a fixed cam disc, a spring suitable of being tensioned in the case of rotation in both directions and tensioned also preliminarily in such an extent that it can be wound up only by means of a torque exceeding an adjusted sensitivity limit, said spring connecting said cam and toothed discs, a pawl oscillating parallel to the faces of said discs and having two pegs one of which cooperates with the cams and teeth respectively of both of said discs and the other with the toothed disc, said discs, pawl and pegs being designed and arranged so as to permit said contact cylinder to perform limited instantaneous angular deflections only, and said choke-coil and transformer connected in series therewith being adjusted so as to balance the line voltage by the secondary voltage of the transformer at the voltage value to be maintained constant.

3. A system for regulating the voltage at a section of a transmission line comprising means connected to said line for changing the voltage at said section; a multi-position mechanism for controlling the operation of said voltage changing means in a step-by-step relation, each step corresponding to a predetermined voltage change by said means; a motive device including an operating circuit containing impedances in permanent electrical connection with the transmission line section and being solely energized thereby, a member in said device being rotatable by torque exerted thereon by currents in said operating circuit in accordance with a difference in voltage at said section as compared to a predetermined voltage; reducing transmission gearing mechanically coupled on its high-speed end with said rotatable member; and apparatus connected between the low-speed end of said gearing and said mechanism for storing rotative energy of said member to operate said mechanism into an adjacent step by an accumulated force substantially greater than the force motivating said member to change the voltage at said section.

4. A system for regulating the voltage at a section of a transmission line comprising means for changing the voltage at said section; mechanism for controlling the operation of said voltage changing means in a step-by-step relation, each step corresponding to a predetermined voltage change by said means; a motive device including an operating circuit containing impedances in permanent electrical connection with the transmission line section and being solely energized thereby, a member in said device being rotatable by torque exerted thereon by currents in said operating circuit in either direction in accordance with the sense of a difference in voltage at said section as compared to a predetermined voltage; reducing transmission gearing mechanically coupled on its high-speed end with said rotatable member; and apparatus connected between the low-speed end of said gearing and said mechanism for storing rotative energy of said member to operate said mechanism into an adjacent step by an accumulated force substantially greater than the force motivating said member to change the voltage at said section to a value closer to the predetermined value.

5. A system for maintaining the voltage at a section of a transmission line at a substantially predetermined value comprising a regulating transformer connected to said line for changing the voltage at said section; a multi-position switching mechanism connected to said transformer for controlling the operation thereof in a step-by-step relation, each step corresponding to a predetermined voltage change by said transformer; a motive device including an operating circuit containing impedances in permanent electrical connection with the transmission line section and being solely energized thereby, a member in said device being rotatable by torque exerted thereon by currents in said operating circuit in accordance with a difference in voltage at said section as compared to said predetermined voltage; reducing transmission gearing mechanically coupled on its high-speed end with said rotatable member; and apparatus connected between the low-speed end of said gearing and said mechanism for storing rotative energy of said member for a predetermined number of rotations thereof to operate said mechanism into an adjacent step by an accumulated force substantially greater than the force motivating said member to change the voltage at said section to a value closer to the predetermined value.

6. A system for regulating the voltage at a section of an alternating current transmission line comprising a tap changing booster transformer connected to said line for changing the voltage at said section; a switching mechanism connected to said transformer for controlling the operation thereof in a step-by-step relation, each step corresponding to a predetermined voltage change by said transformer; a motive device including an operating circuit containing impedances in permanent electrical connection with the transmission line section and being solely energized thereby, a member in said device being rotatable by torque exerted thereon by currents in said operating circuit in either direction in accordance with the sense of a difference in voltage at said section as compared to a predetermined voltage; reducing transmission gearing mechanically coupled on its high-speed end with said rotatable member; and apparatus connected between the low-speed end of said gearing and said mechanism for storing rotative energy of said member for a predetermined number of rotations thereof including an element for releasing the stored energy to operate said mechanism into an adjacent step by an accumulated force substantially greater than the force motivating said member to change the voltage at said section to a value closer to the predetermined value.

7. A system for maintaining the voltage at a section of a transmission line at a substantially predetermined value comprising a regulating transformer connected to said line for changing the voltage at said section; a multi-position switching mechanism connected to said transformer for controlling the operation thereof in a step-by-step relation, each step corresponding to a predetermined voltage change by said transformer; a motive device including an operating circuit containing impedances in permanent electrical connection with the transmission line section and being solely energized thereby, a member in said device being rotatable by torque exerted thereon by currents in said operating circuit in accordance with a difference in voltage at said section as compared to a predetermined voltage; reducing transmission gearing mechanically coupled on its high-speed end with said rotatable member; and apparatus connected between the low-speed end of said gearing and said mechanism for storing rotative energy of said member including a pawl and coacting element arranged to normally hold said mechanism against rotation, a spring windable by said rotatable member, and a cam for disconnecting said pawl and element when said member has rotated a predetermined amount in one direction to operate said mechanism into an adjacent step by an accumulated force of said spring substantially greater than the force motivating said member to change the voltage at said section to a value closer to the predetermined value.

FRANCIS RATKOVSZKY.